(12) United States Patent  
Scaria et al.

(10) Patent No.: US 10,891,951 B2  
(45) Date of Patent: Jan. 12, 2021

(54) VEHICLE LANGUAGE PROCESSING

(71) Applicant: Ford Global Technologies, LLC, Dearborn, MI (US)

(72) Inventors: Lisa Scaria, Milpitas, CA (US); Praveen Narayanan, San Jose, CA (US); Francois Charette, Tracy, CA (US); Ryan Burke, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 197 days.

(21) Appl. No.: 16/162,556

(22) Filed: Oct. 17, 2018

(65) Prior Publication Data

US 2020/0126544 A1 Apr. 23, 2020

(51) Int. Cl.

| | |
|---|---|
| *G10L 15/22* | (2006.01) |
| *G10L 15/16* | (2006.01) |
| *G10L 15/30* | (2013.01) |
| *G10L 15/06* | (2013.01) |
| *G06N 3/04* | (2006.01) |

(52) U.S. Cl.  
CPC ............ *G10L 15/22* (2013.01); *G06N 3/0454* (2013.01); *G10L 15/063* (2013.01); *G10L 15/16* (2013.01); *G10L 15/30* (2013.01); *G10L 2015/223* (2013.01)

(58) Field of Classification Search  
None  
See application file for complete search history.

(56) References Cited

U.S. PATENT DOCUMENTS

| | | | |
|---|---|---|---|
| 8,478,581 | B2 | 7/2013 | Chen |
| 9,552,354 | B1 | 1/2017 | Seligman et al. |
| 9,940,321 | B2 | 4/2018 | Morehead |
| 10,186,252 | B1 * | 1/2019 | Mohammadi ........... G10L 13/10 |
| 10,319,374 | B2 * | 6/2019 | Catanzaro .............. G06N 3/084 |
| 10,332,508 | B1 * | 6/2019 | Hoffmeister ........... G06N 3/084 |
| 2008/0306727 | A1 | 12/2008 | Thurmair et al. |
| 2017/0148433 | A1 * | 5/2017 | Catanzaro ............. G10L 15/183 |
| 2018/0165288 | A1 * | 6/2018 | Chang .................. G06N 3/0445 |
| 2018/0276525 | A1 * | 9/2018 | Jiang .................. G06F 16/3329 |
| 2019/0086925 | A1 * | 3/2019 | Fan ....................... G05D 1/0088 |
| 2019/0189111 | A1 * | 6/2019 | Watanabe ............... G10L 15/16 |

(Continued)

FOREIGN PATENT DOCUMENTS

| | | |
|---|---|---|
| JP | 6326940 B2 | 5/2018 |
| WO | 2018058046 A1 | 3/2018 |

OTHER PUBLICATIONS

Johnson et al., "Google's Multilingual Neural Machine Translation System: Enabling Zero-Shot Translation", arXiv:1611.04558v2, Aug. 21, 2017.

*Primary Examiner* — Jonathan C Kim  
(74) *Attorney, Agent, or Firm* — Brian Hicks; Bejin Bieneman PLC

(57) ABSTRACT

A computing system can translate a spoken natural language command into an intermediate constructed language command with a first deep neural network and determine a vehicle command and an intermediate constructed language response with a second deep neural network based on receiving vehicle information. The computing system can translate the intermediate constructed language response into a spoken natural language response with a third deep neural network and operate a vehicle based on the vehicle command.

18 Claims, 5 Drawing Sheets

(56) References Cited

U.S. PATENT DOCUMENTS

| | | | |
|---|---|---|---|
| 2019/0197121 A1* | 6/2019 | Jeon | G06F 40/56 |
| 2019/0236148 A1* | 8/2019 | DeFelice | G06F 40/56 |
| 2019/0244603 A1* | 8/2019 | Angkititrakul | G10L 15/22 |
| 2019/0251431 A1* | 8/2019 | Keskar | G06F 40/56 |
| 2019/0303759 A1* | 10/2019 | Farabet | G06K 9/4628 |
| 2019/0325068 A1* | 10/2019 | Lai | G06N 3/08 |
| 2019/0371307 A1* | 12/2019 | Zhao | G06F 40/174 |
| 2020/0066270 A1* | 2/2020 | Lee | G10L 15/005 |
| 2020/0098353 A1* | 3/2020 | Olabiyi | G10L 15/16 |

* cited by examiner

VEHICLE LANGUAGE PROCESSING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
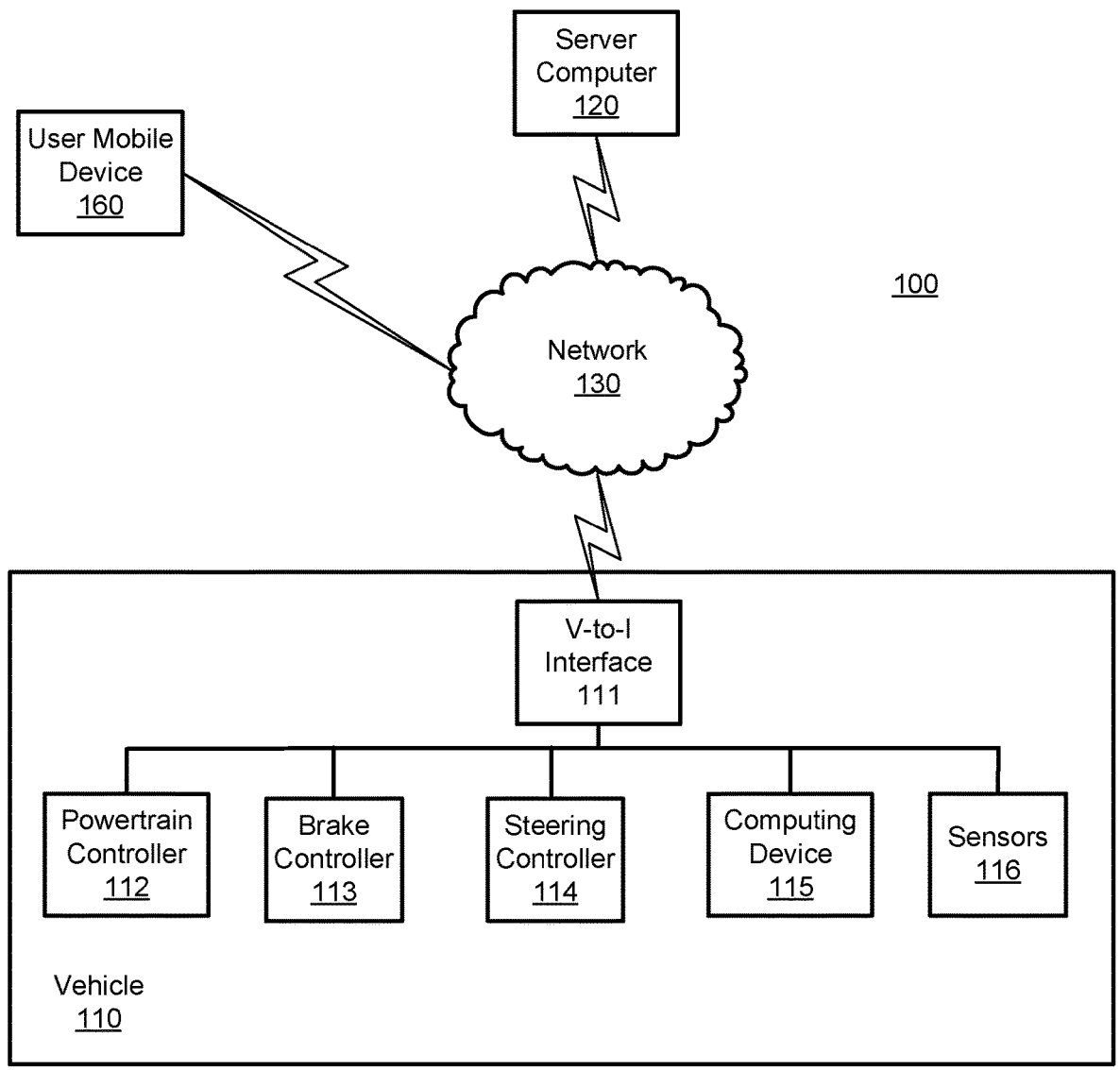
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a vehicle information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine trajectories to be used to operate a vehicle in autonomous or semi-autonomous mode. For example, the computing device can provide information to controllers (e.g., electronic control units or ECUs) to operate vehicle on a roadway in traffic including locations of objects including other vehicles and pedestrians. Based on sensor data, a computing device can determine a path for a vehicle to travel to reach a destination on a roadway in the presence of objects including other vehicles and pedestrians, wherein a path is defined as a line connecting successive locations of a vehicle as it moves from a first location on a roadway to a second location on a roadway. A computing device in a vehicle can determine a path including predicted vehicle trajectories along which the computing device can operate a vehicle to reach a second, destination location on a roadway while avoiding objects including other vehicles and pedestrians.

A path can be an illustration of a path polynomial wherein a line connecting a first location and a second location is defined by a first, second or third degree polynomial function on a vehicle vector. The vehicle vector includes real world vehicle 3D (three-dimensional) pose including real world six-axis vehicle 3D location in x, y, and z spatial coordinates and roll, pitch and yaw rotational coordinates about the x, y, and z axes. The spatial and rotational coordinates are determined relative to a 3D coordinate system, for example latitude, longitude and altitude. A vehicle vector can also include six-axis vehicle 3D accelerations along the six-axis 3D pose directions. Vehicle vector data can be processed to determine a vehicle trajectory, which defines vehicle 2D location speed, 2D (two-dimensional) direction and vehicle latitudinal and longitudinal accelerations with respect to a 2D plane parallel to a roadway, for example a roadway which currently supports the vehicle. Lateral and longitudinal accelerations are determined with respect to the 2D direction. Based on vehicle location, speed, direction and lateral and longitudinal accelerations, a computing device can determine a path polynomial which estimates vehicle future vehicle trajectories that will reach a destination location while maintaining upper and lower limits on lateral and longitudinal accelerations.

In addition to vehicle sensor data, a computing device can rely on inputting natural language commands and outputting natural language responses to determine a path polynomial upon which to operate the vehicle. The computing device can input a natural language command in one of a plurality of natural languages, determine a vehicle action, receive vehicle information, and output a natural language response including the vehicle information in any one of a plurality of natural languages. A natural language is a language spoken by humans that has developed over time as a result of human anthropological and cultural development. This contrasts with constructed languages, which can be artificial languages developed to address specific issues. Examples of constructed languages are Esperanto and Interlingua. Constructed languages can also be latent languages determined by deep neural networks as intermediate results. The natural language command and the natural language response can be in the same, or different, natural languages. The natural language command can include a query, wherein the vehicle action can include determining information from the computing device to be returned in the natural language response. The natural language command can be made in response to a natural language prompt generated by the computing device to elicit the natural language command.

Disclosed herein is a method, including translating a spoken natural language command into an intermediate constructed language command with a first deep neural network, determining a vehicle command and an intermediate constructed language response with a second deep neural network based on receiving vehicle information, translating the intermediate constructed language response into a spoken natural language response with a third deep neural network, and operating a vehicle based on the vehicle command. The constructed language can be a latent constructed language. The spoken natural language command can be text data corresponding to a command spoken in a natural language by a vehicle user and transformed from acquired audio spectrum data into the spoken natural language command by a fourth deep neural network. The spoken language response can be text data and is transformed into audio spectrum data corresponding to a response spoken in a natural language by a fifth deep neural network. The spoken natural language command and the spoken language response can be each in one of a plurality of natural languages. The first deep neural network, the second deep neural network and the third deep neural network can be trained to input the spoken natural language command, output the vehicle command, input vehicle information and output a spoken natural language response using ground truth vehicle commands and vehicle information, sample spoken natural language commands and sample spoken natural language responses.

The first and third deep neural networks can be trained independently to add natural languages from the plurality of natural languages. Operating the vehicle can include determining a cognitive map based on map data and vehicle sensor data. Operating the vehicle can include determining a path polynomial in the cognitive map based on the constructed language command and vehicle sensor data. Operating the vehicle can include determining a destination location on the cognitive map and determining a path polynomial that will permit the vehicle to reach the destination location. The first deep neural network includes a plurality of 1-D convolutional layers and a plurality of fully connected layers configured as a LSTM network. The second deep neural network includes a plurality of 1-D convolutional layers and a plurality of fully connected layers configured as a LSTM network. The spoken natural language command and the spoken language response can be in the same or different natural languages.

Further disclosed is a computer readable medium, storing program instructions for executing some or all of the above method steps. Further disclosed is a computer programmed for executing some or all of the above method steps, including a computer apparatus, programmed to translate a spoken natural language command into an intermediate constructed language command with a first deep neural network, determine a vehicle command and an intermediate constructed language response with a second deep neural network based on receiving vehicle information, translate the intermediate constructed language response into a spoken natural language response with a third deep neural network, and operate a vehicle based on the constructed language command. The constructed language can be a latent constructed language. The spoken natural language command can be text data corresponding to a command spoken in a natural language by a vehicle user and transformed from acquired audio spectrum data into the spoken natural language command by a fourth deep neural network. The spoken language response can be text data and is transformed into audio spectrum data corresponding to a response spoken in a natural language by a fifth deep neural network. The spoken natural language command and the spoken language response can be each in one of a plurality of natural languages. The first deep neural network, the second deep neural network and the third deep neural network can be trained to input the spoken natural language command, output the vehicle command, input vehicle information and output a spoken natural language response using ground truth vehicle commands and vehicle information, sample spoken natural language commands and sample spoken natural language responses.

The computer apparatus can be further programmed to train the first and third deep neural networks independently to add natural languages from the plurality of natural languages. Operating the vehicle can include determining a cognitive map based on map data and vehicle sensor data. Operating the vehicle can include determining a path polynomial in the cognitive map based on the constructed language command and vehicle sensor data. Operating the vehicle can include determining a destination location on the cognitive map and determining a path polynomial that will permit the vehicle to reach the destination location. The first deep neural network includes a plurality of 1-D convolutional layers and a plurality of fully connected layers configured as a LSTM network. The second deep neural network includes a plurality of 1-D convolutional layers and a plurality of fully connected layers configured as a LSTM network. The spoken natural language command and the spoken language response can be in the same or different natural languages.

FIG. 1 is a diagram of a traffic infrastructure system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
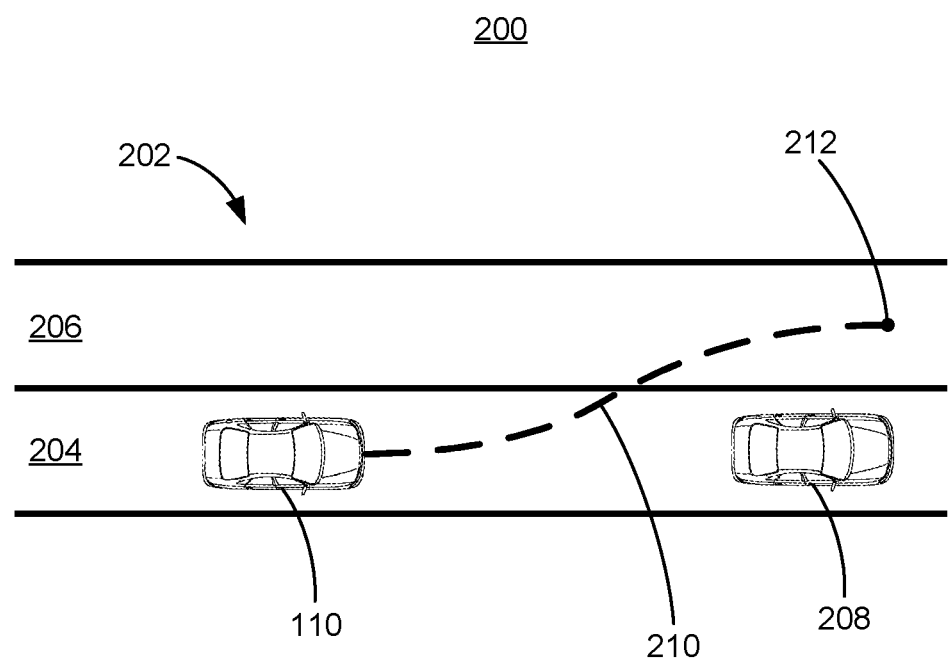
FIG. 2 is a diagram of an example cognitive map.

FIG. 2 is a diagram of a cognitive map 200 that includes an environment nearby vehicle 110 including a roadway 202 having lanes 204, 206 and another vehicle 208. Cognitive map 200 is a 2D representation of the environment proximate to, e.g., within a specified radius such as 500 meters of, vehicle 110 and is determined based on vehicle sensor 116 data and map data, for example GOOGLE™ maps, downloaded via V-to-I interface 111 and network 130 from the Internet, for example and stored at nonvolatile memory of computing device 115. Cognitive map 200 can be determined based on vehicle location determined from sensors 116 including GPS and accelerometer-based inertial navigation systems (INS). Cognitive map 200 can also include information regarding objects including other vehicles 208 and pedestrians for example. Location, size, speed and direction for objects near vehicle 110 can be determined by computing device 115 based on data from vehicle sensors 116 including video, radar and lidar sensors, for example.

Cognitive map 200 can include a path polynomial 210 that estimates or predicts vehicle trajectories from a current location to a destination location 212 in cognitive map 200. Based on path polynomial 210, computing device 115 can determine commands to transmit to controllers 112, 113, 114 to control vehicle steering, braking and powertrain to cause vehicle 110 to travel along path polynomial 210. Computing device 115 can determine which commands to transmit at which times to operate vehicle 110 based on empirically determined data regarding the operation of vehicle 110 in response to the commands. Based on the empirically determined data, computing device can determine a series of commands to be transmitted to controllers 112, 113, 114 as vehicle 110 travels on roadway 202 and thereby operate vehicle 110 on roadway 202 to reach a destination location 212.

In addition to sensor 116 data, computing device 115 can rely on a natural language command from an occupant of vehicle 110 to determine a path polynomial 210. For example, in cognitive map 200, vehicle 110 can be approaching another vehicle 208 from behind in a first lane 204. Vehicle 110 can be approaching another vehicle 208 at a rate wherein vehicle 110 must either slow down, including the possibility of braking to a stop, or change to adjacent lane 206 to avoid a collision or near-collision with another vehicle 208. An occupant of vehicle 110 can determine that vehicle 110 is approaching another vehicle 208 based on the occupant's own visual perception or be warned by computing device 115 using either visual display elements or natural language prompts. For example, computing device can display a warning message and in flashing lights on an information panel or emit sound waves from an audio system corresponding to a natural language prompt for action by an occupant of a vehicle 110.

In response to a visual or auditory prompt, an occupant can issue a natural language command to computing device 115 to direct the operation of vehicle 110. In this example, the natural language commands an occupant can say include "pass vehicle" or "follow vehicle". In the example of FIG. 2, the occupant can say, "pass vehicle", and computing device 115 can determine path polynomial 210 that accomplishes a lane change maneuver. Computing device can acquire audio spectrum data corresponding to the natural language command by means of an audio system that includes a microphone and analog-to-digital (A-D) converters to convert an electrical signal from the microphone into digital audio spectrum data. The audio spectrum data can be processed by an automatic speech recognizer (ASR) system to determine a text data natural language command corresponding to the input natural language command. A text data natural language command includes digital characters corresponding the audio spectrum data. i.e. written language corresponding to the spoken language. A token that identifies the language in which the natural language command was spoken is also output by the ASR.

An ASR system can include a deep neural network that processes mel spectrum (i.e., mel-frequency cepstrum or MFC) data formed by first transforming input audio spectrum data onto a non-linear log-scale mel spectrum based on human hearing response. The ASR inputs mel spectrum data corresponding to the natural language command and outputs a text data natural language command corresponding to the input natural language command. The ASR also outputs a language token to indicate which natural language of a plurality of natural languages the natural language command was in. An ASR can include a deep neural network including both convolutional layers and fully-connected layers trained using ground truth including input natural language commands and corresponding text data natural language commands and language tokens. Ground truth is defined as data/result pairs acquired by means independent from the system under test. Ground truth acquired independently can be used to train deep neural networks.

Figure 4:
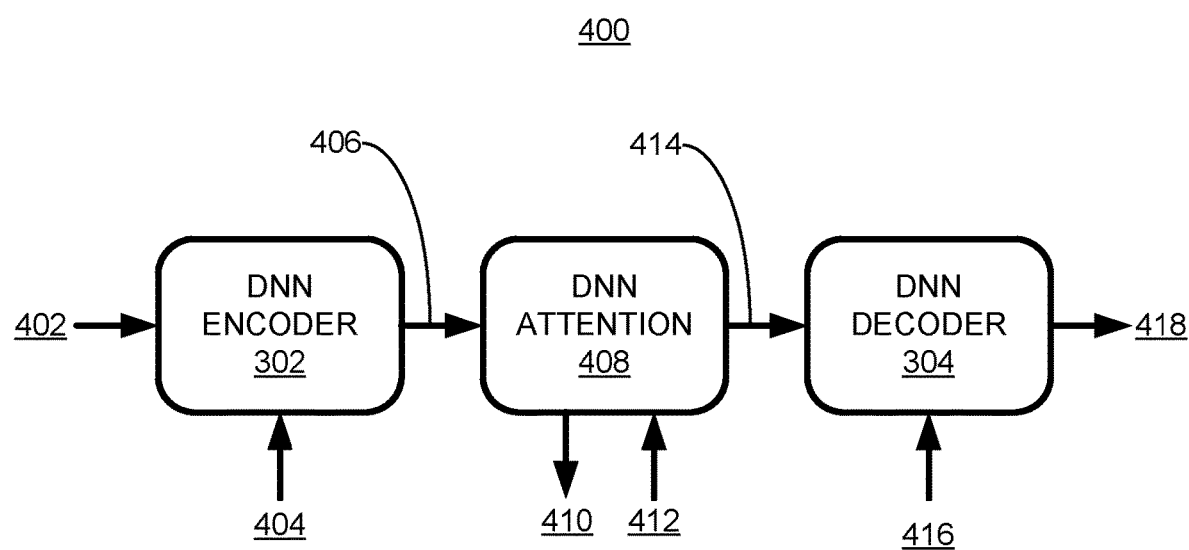
FIG. 4 is a diagram of a vehicle natural language processing system.

The text data spoken language command and language token can be processed by natural language understanding (NLU) system 400 as shown in FIG. 4 produce a vehicle command and a text data natural language response. The text data natural language response can be converted to a spoken natural language response using a Griffin/Lim algorithm to determine audio spectrum data from the text data natural language response. The audio spectrum data can be output via an audio system including digital-to-analog (D-A) converters to convert the digital data to an electrical signal and speakers, for example. In this example, computing device 115 can output a spoken natural language response equal to "passing vehicle" to confirm that the natural language command had been received and that a vehicle command equal to "pass vehicle" was being performed. Spoken natural language commands and spoken natural language responses can each be in one of a plurality of natural languages. Techniques discussed herein improve an NLU system 400 by translating natural language commands into an intermediate constructed language command and processing the intermediate constructed language command to determine a vehicle command and acquire vehicle information. The natural language command can be in one of a plurality of natural languages. The improved NLU system 400 can determine an Interlingua language response including acquired vehicle data, and then translate the Interlingua language response into one of a plurality of natural languages.

Figure 3:
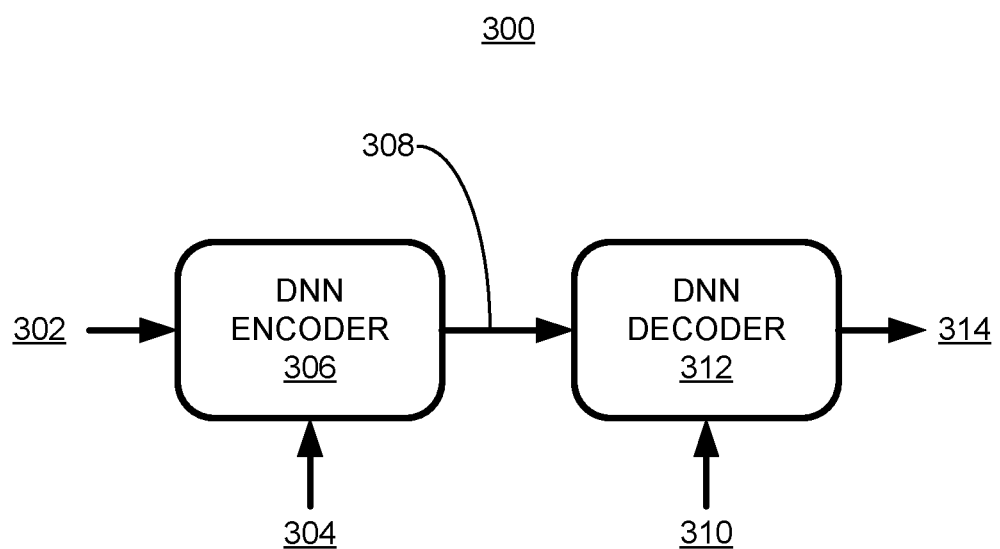
FIG. 3 is a diagram of an example natural language translation system.

FIG. 3 is a diagram of an example deep neural network (DNN) translation system 300. DNN translation system 300 includes a DNN encoder 306 and a DNN decoder 312. DNN encoder 306 inputs text data natural language commands 302 and a language token 304 indicating which natural language of a plurality of natural languages the text data natural language command 302 is in. DNN translation system 300 inputs text data spoken language 302 and a language token 304 to deep neural network (DNN) Encoder 306. Text data spoken language and language tokens can be output from an ASR system as described above in response to input natural language in one of a plurality of natural languages. The ASR system has been trained based on the plurality of languages to output text data natural language 302 corresponding to the input natural language audio spectrum data. DNN Encoder 306 translates the input text data natural language 302 and a language token 304 into latent constructed language 308. A constructed language is an artificial language developed to permit communication between speakers of different natural languages. DNN Encoder 306 outputs a constructed language to communicate with DNN decoder 312. Constructed language 308 is a latent because it is not output as an intermediate result. Latent constructed language 308 is determined by DNN Encoder 306 to communicate with DNN Decoder 312 and is not typically understandable to a user.

DNN Encoder 306 can include a plurality of fully connected computational layers or a plurality of convolutional layers and fully connected computational layers. In an example, DNN Encoder 306 includes a plurality of 1-D convolutional layers that filter the input to remove redundant information and noise, wherein 1-D convolution means the convolutions are performed on vectors. DNN Encoder 306 also includes a plurality of fully connected layers that include computational nodes that input intermediate results from the plurality of 1-D convolutional layers and calculate functions of n variables, wherein n is the number of input variables from the 1-D layer. The fully connected layers are connected in a long short-term memory (LSTM) configuration to permit DNN 306 to determine Interlingua language words and phrases by processing spoken language input 302 including includes multiple text data words. Text data natural language input 302 can include multiple text data words corresponding to multiple time samples within spoken language input 302. DNN 306 determines an Interlingua language output 308 based on context formed by the relative position of words in text data text data natural language input 302 based on language token 304. An example of a deep neural network including 1-D convolution and LSTM layers is the Multilingual Neural Machine Translation System, a system developed by Google, Inc., Mountain View, Calif.

Deep neural network (DNN) Decoder 312, can include a deep neural network architecture including a plurality of fully connected computational nodes, or include the same architecture as DNN Encoder 306, including 1-D convolutional layers and fully connected layers in a LSTM configuration. DNN translation system 300 is trained using ground truth natural language input 302, language tokens 304, 310 and ground truth natural language output 314. Input language token 304 indicates which natural language of a plurality of natural languages to translate into the latent constructed language 308. DNN Encoder 306 can be trained to translate text data natural language 302 and a language token into a latent constructed language using ground truth based on input natural language 302 and input language token 304 while DNN Decoder 312 is trained to translate input latent constructed language 308 into text data spoken natural language 314 words and phrases based on language token 310 and ground truth spoken natural language 314. Text data natural language 314 output can be transformed by techniques discussed above in relation to FIG. 2 into audio spectrum data for output as spoken natural language. By selecting language token 310 to be different than language token 304, DNN translation system 300 can translate words and phrases from a first natural language of a plurality of natural languages into words and phrases of a second natural language of a plurality of natural languages.

DNN translation system 300 can achieve "zero-shot" translation, meaning that the DNN translation system 300 can translate from a first language to a second language without having been trained to translating from the first language to the second language. DNN translation system 300 achieves this by translating from a first language into the Interlingua language and then translating from Interlingua to the second language, requiring only translations to and from each language and latent constructed language thereby reducing ground truth data collection, training time and model size.

FIG. 4 is a diagram of an example natural language processing (NLP) system 400. NLP system 400 can permit a computing device 115 included in a vehicle 110 to process a text data natural language command 402 received from an occupant of a vehicle 110 and, based on a language token 404, determine a latent constructed language command 406 using DNN Encoder 302 as discussed above in relation to FIG. 3. A spoken language command is formed by processing a natural language command with an ASR as described above in relation to FIG. 3 to form spoken language commands and a language token 404 indicating which natural language of a plurality of natural languages the natural language command is in. Natural language commands are a subset of words and phrases available in a natural language selected by relevance to vehicle 110 operation. The set of natural language commands include words and phrases that vehicle 110 can be expected to respond to in the course of directing vehicle 110 operation based on natural language input from an occupant. For example, NLP system 400 can be expected to respond to natural language words and phrases including "go to 123 park street", "stop", "turn left", "take me to work", etc. Natural language commands can also include queries for information, for example, "when will I arrive home?"

DNN Attention 408 is a deep neural network with architecture like DNN Decoder 312 and DNN Encoder 306 that processes latent constructed language commands to determine semantic information corresponding to information in words a phrases of the input spoken natural language commands as translated into the latent constructed language command 406 by DNN Encoder 302. Semantic information is information regarding the meaning of the words and phrases of the input spoken natural language commands as translated into the latent constructed language command 406. By limiting input to a subset of possible natural language words and phrases, the computational resources required to reliably determine semantic information corresponding to the input natural language commands becomes tractable. Semantic information includes vehicle commands 410 output to computing device 115 to direct the operation of vehicle 110. Vehicle commands 410 can also request vehicle information 412 including confirmation from computing device 115 that a vehicle command 410 has been received and is being executed. Vehicle information 412 can include status information on vehicle 110 operations, including information regarding the location, speed and direction of vehicle 110, for example. In examples wherein computing device 115 cannot execute vehicle command 410, computing device 115 can respond with vehicle information 412 including a negative acknowledgement. DNN Attention 408 combines semantic information from the latent constructed vehicle command 406 with vehicle information 412 to determine a latent constructed language response 414. For example, latent constructed language response 414 can includes words and phrases in the latent constructed language that acknowledge to an occupant that a natural language command has been received and processed. In examples where the natural language command includes a query, the latent constructed language response 414 can include information responsive to the query.

DNN Decoder 312 inputs a latent constructed language response 414 and, by the same process as described above in relation to FIG. 3 translates the latent constructed language response 414 into a text data natural language response 418 in one of a plurality of natural languages, wherein the natural language is selected by inputting a language token 416, which can be the same or different than language token 404. A text data natural language response 418 can be transformed into audio spectrum data corresponding to a natural language response for emission as audio waves by a process as described above in relation to FIG. 2. A natural language processing system can be improved by techniques disclosed herein including translating natural language commands from a plurality of natural languages into a latent constructed language before semantic processing based on a latent constructed language, wherein semantic processing includes outputting a vehicle command, receiving vehicle data and outputting a latent constructed language response. A latent constructed language response can be translated into one of a plurality of natural languages before being output as audio waves.

The natural language processing system architecture corresponding to NLP system 400 can be used for applications in addition to vehicle 110 operation. Any application that requires multilingual spoken input and output to perform tasks that can be described with set of latent constructed language commands can benefit from the improvements described herein. For example, an NLP system 400 could be programmed to be a digital assistant to make appointments and remind a user of project due dates. The digital assistant could function in German, French and English simultaneously by training NLP system 400 once for each language. Additional languages can be added by additional retraining of the DNN Encoder 302 and DNN Decoder 312. DNN Encoder 302 and DNN Decoder 312 can be trained independently for additional natural languages, meaning that the model size grows linearly with respect to the number of natural languages, rather than exponentially if all natural language pairs are considered. NLP system 400 architecture reduces ground truth data collection, training time, and model size by training DNN Attention 408 using a latent constructed language only, as opposed to training DNN Attention 408 for each of a plurality of natural languages, for example. Improvements and retraining of DNN Attention 408 are immediately available to a plurality of natural languages as soon as the improvements and retraining are complete, with no re-training for each natural language. In addition, DNN Attention 408 can be trained on a single natural language dataset, since the latent constructed language commands are the same for the plurality of natural languages. Model size, which is a measure of the amount of programming data required to program DNN Attention 408 is constant in NLP system 400, whereas in NLP systems without a latent constructed language command 406 and latent constructed language response 414, the model size can grow linearly with the number of natural languages supported.

Figure 5:
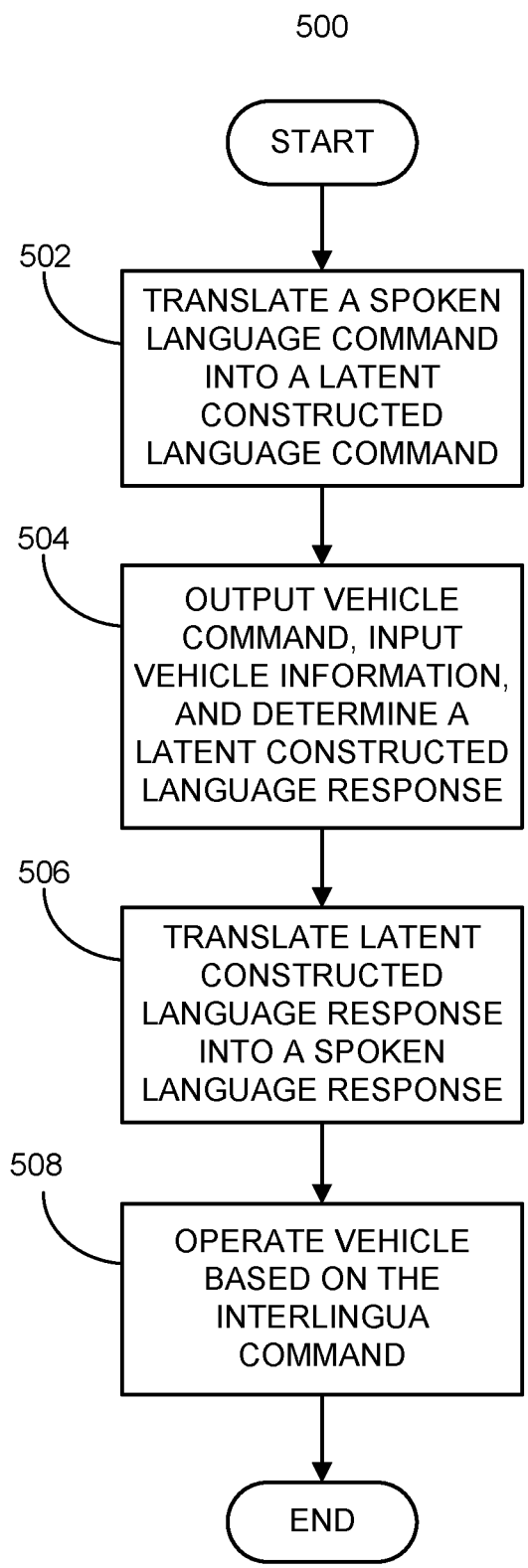
FIG. 5 is a flowchart diagram of a process to operate a vehicle based on natural language processing.

FIG. 5 is a diagram of a flowchart, described in relation to FIGS. 1-4, of a process 500 for operating a vehicle 110 based on natural language processing using a latent constructed language. Process 500 can be implemented by a processor of computing device 115, taking as input information from sensors 116, and executing commands and sending control signals via controllers 112, 113, 114, for example. Process 500 includes multiple blocks taken in the disclosed order. Process 500 could alternatively or additionally include fewer blocks or can include the blocks taken in different orders.

Process 500 begins at block 502, wherein a natural language processing (NLP) system 400 receives a text data spoken natural language command 402 and a language token 404. Spoken natural language command 402 and language token 404 can be text data output from an ASR as described in relation to FIG. 3 to input audio spectral data corresponding to a natural language command spoken by an occupant of a vehicle 110. Trained DNN Encoder 302 inputs the text data natural language command 402 and language token 404, translates the natural language command into a latent constructed language and outputs a latent constructed language command 406 corresponding to the text data natural language command 402 to DNN Attention 408 as discussed in relation to FIG. 4, above.

At block 504 DNN Attention 408 processes the latent constructed language command 406 input from DNN Encoder 302 to determine semantic information included in the latent constructed command 406 including a vehicle command 410 which is output to computing device 115. Computing device 115 inputs the vehicle command 410 and determines vehicle information 412 to be output to DNN Attention 408. DNN Attention 408 inputs vehicle information 412 and, based on the latent constructed command 406 and vehicle information 412, DNN Attention 408 determines a latent constructed language response 414 to output to DNN Decoder 312.

At block 506 DNN Decoder 312 inputs a latent constructed language response 414 and a language token 416. The language token can be determined to be the same as language token 404 or determined by user input to select from the natural languages DNN Decoder 312 has been trained to translate. DNN Decoder 312 translates the latent constructed language response 414 into text data corresponding to a spoken natural language response in a natural language. DNN Decoder 312 can be trained to translate latent constructed language responses 414 in new and different natural languages independently of the training of DNN Encoder 302 and DNN Attention 408. DNN Decoder 312 outputs a text data spoken natural language response 418 to be converted to audio spectrum data and output as audio waves corresponding to a natural language response as described above in relation to FIG. 2. The natural language response can acknowledge the receipt of a natural language command, for example and can include translated vehicle information 412 in response to queries.

At block 508 computing device 115 operates vehicle 110 based on the vehicle command 410 received from DNN Attention 408 in block 504. For example a vehicle command can be used to determine a path polynomial 210 for operating vehicle 110 on as discussed above in relation to FIG. 2. Computing device 115 can respond to a vehicle command 410 by returning vehicle information 412 to DNN Attention 408. Vehicle information 412 can include information confirming that the vehicle command 410 is being executed or be responsive to a request for information, for example. Following block 508 process 500 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
translating a spoken natural language command into an intermediate constructed language command with a first deep neural network;
determining a vehicle command and an intermediate constructed language response with a second deep neural network based on receiving vehicle information;
translating the intermediate constructed language response into a spoken natural language response with the third deep neural network; and
operating a vehicle based on the vehicle command;
wherein the first deep neural network, the second deep neural network and the third deep neural network are trained to input the spoken natural language command, output the vehicle command, input vehicle information and output the spoken natural language response using ground truth vehicle commands and vehicle information, sample spoken natural language commands and sample spoken natural language responses.

2. The method of claim 1, wherein the constructed language is a latent constructed language.

3. The method of claim 1, wherein the spoken natural language command is text data corresponding to a command spoken in a natural language by a vehicle user and transformed from acquired audio spectrum data into the spoken natural language command by a fourth deep neural network.

4. The method of claim 3, wherein the spoken natural language response is text data and is transformed into audio spectrum data corresponding to a response spoken in a natural language by a fifth deep neural network.

5. The method of claim 1, wherein the spoken natural language command and the spoken natural language response are each in different ones of a plurality of natural languages.

6. The method of claim 5, wherein the first and third deep neural networks are trained independently to add natural languages from the plurality of natural languages.

7. The method of claim 1, wherein operating the vehicle includes determining a cognitive map based on map data and vehicle sensor data.

8. The method of claim 7, wherein operating the vehicle includes determining a path polynomial in the cognitive map based on the constructed language command and vehicle sensor data.

9. A system, comprising:
a processor; and
a memory, the memory including instructions to be executed by the processor to:
translate a spoken natural language command into an intermediate constructed language command with a first deep neural network;
determine a vehicle command and an intermediate constructed language response with a second deep neural network based on receiving vehicle information;
translate the intermediate constructed language response into a spoken natural language response with a third deep neural network; and
operate a vehicle based on the vehicle command;
wherein the first deep neural network, the second deep neural network and the third deep neural network are trained to input the spoken natural language command, output the vehicle command, input vehicle information and output the spoken natural language response using ground truth vehicle commands and vehicle information, sample spoken natural language commands and sample spoken natural language responses.

10. The system of claim 9, wherein the constructed language is a latent constructed language.

11. The system of claim 9, wherein the spoken natural language command is text data corresponding to a command spoken in a natural language by a vehicle user and transformed from acquired audio spectrum data into the spoken natural language command by a fourth deep neural network.

12. The system of claim 11, wherein the spoken natural language response is text data and is transformed into audio spectrum data corresponding to a response spoken in a natural language by a fifth deep neural network.

13. The system of claim 9, wherein the spoken natural language command and the spoken natural language response are each in different ones of a plurality of natural languages.

14. The system of claim 13, wherein the first and third deep neural networks are trained independently to add natural languages from the plurality of natural languages.

15. The system of claim 9, wherein operating the vehicle includes determining a cognitive map based on map data and vehicle sensor data.

16. The system of claim 15, wherein operating the vehicle includes determining a path polynomial in the cognitive map based on the spoken language command and vehicle sensor data.

17. A system, comprising:
means for controlling vehicle steering, braking and powertrain; and
means for:
- translating a spoken natural language command into an intermediate constructed language command with a first deep neural network;
- determining a vehicle command and an intermediate constructed language response with a second deep neural network based on receiving vehicle information;
- translating the intermediate constructed language response into a spoken natural language response with a third deep neural network; and operating a vehicle based on the vehicle command and the means for controlling vehicle steering, braking and powertrain;

wherein the first deep neural network, the second deep neural network and the third deep neural network are trained to input the spoken natural language command, output the vehicle command, input vehicle information and output the spoken natural language response using ground truth vehicle commands and vehicle information, sample spoken natural language commands and sample spoken natural language responses.

18. The system of claim 17, wherein the constructed language is a latent constructed language.

* * * * *